United States Patent [19]

Lewis et al.

[11] Patent Number: 5,665,814
[45] Date of Patent: Sep. 9, 1997

[54] LOW COST, BLUSH-RESISTANT SILANE/ SILICA SOL COPOLYMER HARDCOAT FOR OPTICAL CLEAR PLASTICS

[75] Inventors: William Lewis, Chula Vista, Calif.; George Galic, Columbia Heights, Minn.

[73] Assignee: Abchem Manufacturing, Chula Vista, Calif.

[21] Appl. No.: 430,251

[22] Filed: May 4, 1995

[51] Int. Cl.$^6$ .................................................. C08L 83/06
[52] U.S. Cl. .................. 524/588; 524/316; 524/319; 524/356; 524/364; 524/790; 524/859; 528/28
[58] Field of Search ..................... 524/316, 319, 524/356, 364, 588, 790, 859; 528/28

[56] References Cited

U.S. PATENT DOCUMENTS

| | | | |
|---|---|---|---|
| 3,986,997 | 10/1976 | Clark | 524/300 |
| 4,027,073 | 5/1977 | Clark | 428/412 |
| 4,299,746 | 11/1981 | Frye | 524/266 |
| 4,309,319 | 1/1982 | Vaughn, Jr. | 106/189 |
| 4,313,979 | 2/1982 | Frye et al. | 427/387 |
| 4,324,712 | 4/1982 | Vaughn, Jr. | 524/767 |
| 4,324,839 | 4/1982 | Frye | 428/412 |
| 4,413,088 | 11/1983 | Frye | 524/714 |
| 4,414,349 | 11/1983 | Vaughn, Jr. | 524/261 |
| 4,746,693 | 5/1988 | Meder | 524/306 |
| 5,013,508 | 5/1991 | Troester | 264/224 |
| 5,102,695 | 4/1992 | Guest et al. | 427/164 |
| 5,221,560 | 6/1993 | Perkins et al. | 427/515 |
| 5,296,295 | 3/1994 | Perkins et al. | 428/412 |

OTHER PUBLICATIONS

GE Silicones, SHC 1200 Optical Grade Abrasion—Resistant Silicone Hard Coat & SHP 200 Primer, Product Information NoCDS 4532. May 1990.

SDC Product Information "SILVUE Abrasion Resistant Coatings Application Information" SDC–130–0. Mar. 1993.

*Primary Examiner*—D. S. Nakarani
*Attorney, Agent, or Firm*—David George Johnson

[57] ABSTRACT

An improved silane/silica sol copolymer hardcoating composition for protecting optical plastic substrates from scratching is able to be manufactured at lower costs and to provide much-improved ease of use in transportation, storage, dipbath stability, and blush resistance in ordinary cleanroom atmospheres. The silane/silica sol copolymer is formed as a direct reaction product of an acidic silica sol and an monomethyl trialkoxy silane, preferably substantially monomethyltriethoxysilane, in ratios of 30:70 to 70:30, most preferably about 40:60. A tail solvent aids blush resistance and adhesion to unprimed polycarbonate. Optionally, colloidal silica sol dissolved in water-miscible solvent may be reacted in a second stage with acidic aqueous colloidal silica sol earlier silanized with monomethyl trialkoxy silane.

7 Claims, No Drawings

LOW COST, BLUSH-RESISTANT SILANE/ SILICA SOL COPOLYMER HARDCOAT FOR OPTICAL CLEAR PLASTICS

I. FIELD OF THE INVENTION

The chemical family of silane/silica sol copolymer compositions finds commercial use in heat-curing scratch-resistant hardcoats applied to clear plastic sheets and molded parts. The present invention makes improvements in lowering costs and improving ease of use of specific chemical compositions of monomethyltrialkoxy silane copolymerized with acidic aqueous silica sol, to be dipcoated onto polycarbonate molded optical lenses (including auto headlamp lenses and spectacle lenses and sports eyewear) and polycarbonate extruded sheet (used for windows and protective covers).

II. BACKGROUND OF THE INVENTION

Clark (U.S. Pat. No. 3,986,997, issued Oct. 19, 1976; and U.S. Pat. No. 4,027,073, issued May 31, 1977) is the basis for the first commercially useful silane/silica sol copolymer hardcoats for optical plastics, and Clark is still serving as the basis for the commercially successful line of nontintable clear hardcoats for optical plastics offered by SDC Coatings of Anaheim, Calif. (SDC is a joint-venture company of Swedlow and Dow Corning; the latter is the assignee of the Clark patents). SDC's commercial dipcoating formulation Silvue 101 is believed to be a higher % solids version of a Clark formulation (suited for dip coating); all Clark coatings are acidic pH.

Next came the GE Silicone entries into this field, as embodied in Frye (U.S. Pat. No. 4,299,746, issued Nov. 10, 1981; U.S. Pat. No. 4,324,839, issued Apr. 13, 1982; U.S. Pat. No. 4,413,088, issued Nov. 1, 1983) and Vaughn (U.S. Pat. No. 4,309,319, issued Jan. 5, 1982; U.S. Pat. No. 4,324,712, issued Apr. 13, 1982; U.S. Pat. No. 4,414,349, issued Nov. 8, 1983). All the abovementioned GE Silicone patents employ an alkaline pH aqueous colloidal silica dispersion, and their resulting coatings are alkaline pH, in contrast to Clark's. GE's commercial dipcoating formulation SHC-1200 is a commercially useful reference point.

Both the Clark/SDC and the Frye/Vaughn/GE coatings form heat-cured clear coating films of excellent scratch resistance (commonly tested with steel wool pads under load with a rubbing action, to simulate cleaning-type damage) and thereby offer essentially equivalent protection to the clear plastic substrates, when applied and cured at equal thicknesses. Both are sold at very high prices (on 100% solids basis, typically $80–110 per pound or more). Because of a greater propensity for autopolymerization inherent in the alkaline aqueous dipcoating solutions of the Frye/Vaughn/GE formulas, wherein polysiloxane bond formation via condensation reaction is favored over maximizing silanol stability (particularly as storage temperature or bath temperature is increased towards room temperatures), use of the acidic aqueous silica/silica sol copolymer Clark/SDC compositions is believed to be preferred, and therefore is the chemical basis for the present invention.

For users purchasing these liquid coatings, in addition to paying high prices for the coating material, there is the special handling required of refrigerated shipping and storage, and most particularly when dipcoating tanks are of large capacity, the necessity to keep the contents chilled to minimize rate of auto polymerization. "For maximum solution stability, Silvue abrasion-resistant coatings should be refrigerated at −18 to +4 C. degrees (0 to 40 F. degrees)" from SDC Product Information Sheet #130-0, 03/93).

Another indirect cost to the user is the need to apply these water-based silane/silica sol copolymers in dip, flow or spray coating operations and coating solvent-drydown areas at very low humidity, typically a maximum of 35–40% R.H. Reference is made to GE Silicones product literature titled "SHC 1200 Optical Grade Abrasion-Resistant silicone Hard Coat & SHP Primer" #CDS 4532 (5/90), stating . . . "relative humidity controlled to 35% or less", and the previously-referenced Silvue literature, stating . . . "relative humidity of less than 40% is recommended. Variations from these conditions may result in blushing of the coating or a poor film formation". Thus, for optically and cosmetically satisfactory hardcoatings of spectacle lenses and other optical polycarbonate products, not only are the usual clean room conditions, with HEPA-filtered, laminar airflow desirable, but the mandated maximum relative humidities are below the range which can be readily attained by ordinary HVAC interior air conditioning systems during year-round use. Supplemental dehumidification is needed, calling for expensive regenerative-desiccant-bed air-handling equipment which can easily exceed $100,000 capital, just to handle the volume of clean air recirculating within a fully-enclosed automated cleaning and dipcoating line for spectacle lenses.

"Blush" can be defined as a hazy or foggy appearance within the otherwise-transparent cured film of the coating. By Applicants' personal knowledge, early versions of low-solids, high-water-content Clark coatings when applied, dried, and cured in ordinary, ambient conditions had very poor "blush" resistance; 30 grains of moisture or less was then specified as necessary in the coating drydown area's air. Subsequently, the added step of azeotropic stripping of those 20% nominal solids was found to remove both excess alcohol and part of the excess water, so that the resulting stripped 35%-solids Clark solutions had greater "blush" resistance & humidity tolerance. However, this stripping operation adds substantially to manufacturing costs.

Since the time of the Clark and Frye/Vaughn inventions, solvent-based colloidal silica sols have become commercially available. Potentially, they represent an alternative way of reducing these silane/silica sol copolymer hardcoats' sensitivity to ambient levels of humidity and increased "blush" resistance. Excess water in the liquid coating composition is defined as that which exceeds 100% stoichemetric amounts needed for hydrolysis of the alkoxy groups on the silane (3 moles of water per 1 mole of trialkoxy silane), in order to form the siloxane bond between the silane and the silica sol. Use of a solvent-based silica sol may actually require adding water to meet stoichemetric requirements for proper formation of the copolymer. However, the economic impact of replacing the aqueous silica sols with solvent-based silica sols is extremely negative, by at least a five-fold to ten-fold price factor. For example, Clark's preferred aqueous silica, Nalcoag 1034A (from Nalco Chemical; Naperville, Ill.), costs about $3 per pound on 100% solids basis, in drum quantities. By comparison, an alcohol-based sol of equivalent particle size from Nissan Chemical (New York City) costs over $75 per pound on equivalent 100% solids basis. A more recent one commercialized by Nalco costs about $17 per pound on 100% solids basis, so for lowest costs, solvent-based silicas need to be minimized or eliminated in the coating formulation.

Notwithstanding this cost factor, solvent-based silicas have been copolymerized with various organofunctional (most commonly, epoxide attached by propyl to silicon) trialkoxy silanes to make tintable dipcoatings for protecting plastic ophthalmic prescription spectacle lenses. Such coated lenses can be readily dip-dyed for desirable colorations. In these formulations, the organofunctional group attached to the silane is chosen for dye receptivity. Such coatings can be crosslinked by heat (examples in which Applicant Lewis was co-inventor are U.S. Pat. No. 5,013,608 and 5,102,695) or by ultraviolet radiation (examples in which Applicant Lewis was co-inventor are U.S. Pat. No. 5,221,560 and 5,296,295). These specialized tintable Rx lens coatings are used in lower volumes high priced lenses, so they can tolerate higher-priced silicas and silanes than the general-purpose Clark hardcoatings.

III. Objectives of the Present Invention

It is one objective of the present invention to make an acidic silane/silica sol copolymer hardcoating with the lowest possible manufacturing costs, by employing mostly or all low-cost aqueous silica sols with minimal or no solvent-based sols, and furthers by using the copolymer "reaction Products" without any subsequent step of azeotropic stripping of excess solvent and water.

It is another objective of the present invention to make said acidic silane/silica sol copolymer compositions which heat-cure to transparent films of equal or better hardness and steel-wool scratch resistance as the competitive SDC and GE coatings.

It is another objective of the present invention to make said silane/silica sol copolymer compositions with improved resistance to autopolymerization/gellation and thereby eliminate any need for refrigerated transportation, and improves stability in dipbath operating conditions and/or in inventory storage.

It is another objective of the present invention to eliminate any need to use desiccant air-drying equipment where the liquid coating is applied and devolatilized, and be able to successfully dry down these coating films without "blush" using relative-humidity-control conditions (typically 40–55% R.H.) achievable with normal HVAC air-conditioning.

It is another objective of the present invention to make a silane/silica sol copolymer in a "self-priming" formulation which successfully adheres to polycarbonate substrates without priming or any special pre-treatment other than standard washing to remove surface impurities.

IV. Summary of Invention.

The present invention is an improved acidic silane/silica sol copolymer hardcoating composition for protecting optical plastic substrates. In a preferred embodiment, the acidic silane/silica sol copolymer is formed as a direct reaction product of an acidic aqueous silica sol and an monomethyl trialkoxy silane other than methyl trimethoxy silane, in dry weight ratios of 30:70 to 70:30, most preferably about 40:60. Preferably, no distillation off nor vacuum stripping of excess solvent and/or excess water is required, just control of temperature and time. The formulation also contains a "tail solvent". Herein, a "tail solvent" defined as "the last to leave" during devolatilization of the wet coating film. Therefore, in an aqueous coating with one or more alcohols (as byproduct of silane hydrolysis, if not added as part of the formulation), a tail solvent has lower volatility than water and the lowest evaporation rate and/or highest boiling point of all the solvents present. Preferrably, it may have a B.P.>100° C.

Surprisingly, it has been found that the "monomethyl trialkoxy" silane of choice in the cited Clark & Frye/Vaughn patents, methyltrimethoxysilane (Z6070, in Dow Corning product nomenclature) contributes greatly to the problems previously listed. Both of the SDC and GE commercial hardcoatings mentioned previously also can be logically deduced to substantially employ this silane as the monomethyl trialkoxy silane constituent (as seen by their % solvent breakdown in their respective MSDS data sheets, which show very high % methanol). The only exception to this is an example found in Frye U.S. Pat. No. 4,324,839 wherein tiny amounts of monomethyl triacetoxy silane is used with predominantly methyltrimethoxysilane in order to buffer the alkaline sol pH in Examples 1–3 (thus using the tiny amounts of monomethyl triacetoxy silane as latent source of acetic acid).

Applicants have found that higher-alcohol substituents for the alkoxy group are preferred over methoxy, for reasons mentioned herein, and specifically, ethoxy is preferred over methoxy. All silane/silica sol copolymer prior art is silent on any such advantages, nor even consideration of ethoxy-based silanes in any examples. Therefore, the central element of the present invention is that Applicants employ mostly monomethyltriethoxysilane (using ethanol—or higher alcohols—as the alkoxy group) in Applicants' choice for monomethyl trialkoxy silane, with minor (<50%) or, preferably, no methyltrimethoxysilane in the formulation.

V. Detailed Description of Invention.

The silica sol constituents are dispersions of colloidal silica of average particle size <100 millimicrons in diameter, preferrably acidified and predominantly aqueous (although some blends with solvent-based sols have special benefits which may offset their higher costs), and more preferably, an average particle size of 10–30 millimicrons. In one preferred embodiment, the chosen acidified silica sol is Nalcoag 1042 (from Nalco Chemical; Naperville, Ill.), having nominal 34% $SiO_2$ solids and about 15-millimicron average particle size. Nyacol 2034DI, made by the PQ Corporation, Valley Forger Pa., is a functional equivalent to Nalcoag 1042. See Example 1 & others. In another preferred embodiment, a solvent-based sol (Nalco 1057, 30% solids in glycol ether (2-propoxyethanol)) is chosen along with the acidified aqueous silica sol Nalcoag 1042, so the resultant coating is a copolymer of both. See Example 2 & others.

In the preferred 30:70 to 70:30 dry weight ratios (calculated as $SiO_2$: $CH_3SiO_{3/2}$) of the present invention for silica sol:monomethyl trialkoxy silane, there may be a stoichemetric excess of water already present. Mixing monomethyltriethoxysilane and silica sol constituents in the presence of acetic acid (or formic acid, or similar weak organic acid) at the desired pH range causes hydrolysis of the alkoxy groups on the silane and start of condensation-reaction copolymerization between the silica sol and silane constituents, which is optionally promoted by warming the reaction mixture to a moderately elevated temperature. Copolymerization rate (sometimes called "silanization") is a function of the specific acid, concentrations of reactants, time, temperature and pH. Generally, a pH from 4.5 to 5.5 appears to be optimum for storage stability of the liquid coating. Less acid during hydrolysis can speed up the aging or "bodying" of the coating (with more acid added later) but can increase undesirable branching of the siloxane oligomers formed. Only small amounts of strong organic mineral acids can be tolerated by the coatings (extremely low pH is to be avoided)—the buffered weak organic acids are strongly preferred, in the previously mentioned preferred pH range. These weak organic acids, such as acetic acid, are buffered by the added catalyst and can be further buffered by volatile amines, whether or not they act as cure catalysts.

Coatings of the present invention are thermosetting, crosslinking after evaporation of the solvent and water by well-known siloxane condensation reactions, so in theory any of those siloxane condensation catalysts commonly known to those skilled in the art could be used in the cure reaction. However, some work better at the lower temperatures which are tolerated by the optical plastic substrates (typically 80–130 C.), and others lack miscibility, or upset the pH range needed for coating solution stability. So, like the Clark acidic aqueous silica sol:monomethyl trialkoxy silane copolymers, cure reactions can employ buffered latent catalysts; alkali metal salts of carboxylic acids, amines or quaternary amines (amine carboxylates), and ammonium carboxylates. For example, sodium acetate acts as an in situ latent buffered catalyst, such that, after all solvent and water is removed and heating occurs, the catalyst breaks down to give the high-pH conditions known to promote siloxane condensation. Applicants also have prior experience with metal complexes such as aluminum acetylacetonate, but find the quaternary amines (amine carboxylates) are preferred as most active. Typical concentrations are 1.0% or less, measured "solids on solids" ("s/s"), based on the total dry weight in the formulation.

In addition to the methyltriethoxysilane used as a major component of the coatings of the present invention, smaller amounts of other organofunctional silanes such as methacryloxypropyl trimethoxysilane, glycidoxypropyl trimethoxysilane, chloropropyl trimethoxysilane, glycidoxypropyl methyldiethoxysilane, etc., may be added. Typically, such silanes would be added to increase adhesion to a substrate or to a subsequently applied overcoating (especially via vacuum deposition) or to further increase flexibility of the coating. In order to maximize cured coating film hardness and scratch resistance, the resulting silane mix should still be mostly monomethyl silane. Tint-uptake enhancing additives (see previously-cited U.S. Pat. Nos. 5,013,608 and 5,102,695), UV absorbing, or antifog-promoting additives are also contemplated.

When the desired degree of copolymerization (sometimes called "bodying") has been reached, cooling and/or dilution of the reaction mixture with cold solvent helps stop the copolymerization. Diacetone alcohol or (blends of) lower-aliphatic alcohols are preferred. Up to about half of the aqueous silica may be replaced with an alcohol-based silica, if desired, to further improve the coating stability.

When a solvent-based silica is used in conjunction with an aqueous silica, it is important that the aqueous silica be at least partially silanized before adding the solvent-based silica (and additional silane), or else compatibility problems and/or precipitates can result. Likewise, silanization should be far along toward completion before the latent catalyst ingredient is added, whichever type of silica is used, or else precipitates and gel formation will be excessive. It is preferred to react the solvent-based silica with silane in the presence of the (silanized) aqueous silica, so that the latter is the source of water for hydrolysis of the silane reacted with the solvent-based silica.

In a specially preferred embodiment, diacetone alcohol is selected as the "tail solvent". It is present at a level of 3–20% of the total coating formulation in its "ready-to-use" state. Diacetone alcohol was found to be preferred over ordinary aliphatic alcohols such as butanol, 1-methoxy-2-propanol, or Cellosolve (alkoxy ethanol) alcohols or their esters, or commonly available ketones, for its desirable balance of hydrogen bonding, polarity, and miscibility with the siloxane copolymer backbone. It also seems to contribute to primerless adhesion on polycarbonate substrates and to minimizing blush problems during drydown.

The coating compositions of the present invention can be applied by any conventional process, including dip, flow, spin, and spray, although for high-volume automated coating of both sides of the optical plastic substrates at minimum costs, dipping is usually preferred.

A unique and surprising feature of the coating solutions of the present invention is that they can be prepared at ambient temperature in a simple process using extremely simple hardware. In the place of expensive custom-engineered reactors, wiped-film evaporators and/or distillation systems for stripping under reflux which are used with some prior art technologies known to Applicants, we have found that a balance, transfer pump, tubing, filter, and a manual or mechanical means of solution agitation are all that are required in simplest elements. A drum heater to accelerate the initial aging or "bodying" of the coating solution is optional. Thus, the capital costs for equipment can be reduced to 1/10th or less. Chillers, as would be required for making—or using—methyltrimethoxysilane-based coatings, are also unnecessary.

"Bodying" of the coating solution, i.e., heating to elevated temperature or aging at room temperature to increase viscosity, presumably by fostering oligomerization and molecular weight of the resulting silane/sol copolymer thermoset resin, is commonly carried out to improve flow-out of the coating. The use of leveling or wetting agents improves flow-out and smoothness of the coating, especially when non-aqueous silicas are used. Such surfactants are preferably Fluorad FC-430 (a non-ionic fluorinated alkyl ester made by 3M Co., St. Paul, Minn.), used at a typical concentration of 0.01–0.1PHR (parts hundred resin), but alternatively a silicone-glycol copolymer such as DC 190 made by Dow Corning Corp., Midland, Mich.) or BYK-300 (made by Byk-Chemie USA; Wallingford, Conn.) could be used. Use of such surfactants is preferred because of the good surface smoothness obtained, even on imperfectly cleaned substrates, and because reducing the need for a bodying step can improve the subsequent shelf life of the coating.

The storage and dip-bath stability of the coating compositions of the present invention depends, as expected from the prior art cited, on a variety of factors including pH, co-solvents or tail solvents added, loss of solvent and/or water due to evaporation, and ambient temperature. Nevertheless, under normal use and storage, the coating compositions of the present invention will be essentially stable (i.e., useful) for at least several weeks at room temperature, and may be useably stable for months. Stability—or the lack thereof—is determined by significant increases in haze or plugging of filters due to the rate of gelation or onset of catastrophic gelation; or the loss of desired properties in the cured coating such as adhesiveness to the coated substrate, scratch resistance, or clarity. On polycarbonate, the coatings may require longer cure at a given temperature (typically 121–130 C.) to achieve 100% adhesion as the coating ages. This increasingly reluctant adhesion with increased aging of the liquid coating continues until even an overnight cure (nominal 16 hours) is insufficient (unless freshly-prepared coating is blended in). In contrast, with fresh coating, 100% adhesion is achieved typically in 2–6 hours at 121–130 C., as measured by the well-known cross-hatched tape adhesion test (ref:ASTM-D-3359, modified by substitution of 3M #600 tape instead of #710 for use in this test, due to its greater adhesiveness, thus providing a relatively more "severe" test).

A surprising result obtained with the coatings of the present invention is the lack of crazing, cracking and/or adhesion loss when extra-thick coatings are applied and cured. While not wishing to be bound to a particular theory, we believe that, consistent with their lower tendency to gel in solution, the molecular structure of these compositions of the present invention cure, cross-link, and/or set up more slowly, after the wet coating has been applied onto plastic substrates, in a way that retains critical flexibility as the coating dries down and cures, reducing the residual stress within the coating film. By contrast, applicants believe that methyltrimethoxysilane-based coatings "set up" too quickly due to higher inherent reactivity, probably while there is still residual solvent in the coating. Thus, although from a theoretical viewpoint the final cured coating made from methyltrimethoxysilane ("MTMS") or methyltriethoxysilane ("MTES") would be expected to be the same, we find our cured coatings are in fact demonstrably different from prior art based on methyltrimethoxysilane, regarding lack of crazing, cracking and/or adhesion loss when extra-thick coatings are applied and cured.

A further advantage of coatings of the present invention over coatings of the prior art is the potentially higher flash point and lower vapor toxicity resulting from the effective replacement of methanol. The MSDS sheet for GE's SHC-1200 shows 17% methanol, which has 200 ppm TLV, and 19 C (67 F.) flash point. In contrast, Applicants Example 1 has 0% methanol, with ethanol instead having 1000 ppm TLV, and 25 C. (78 F.) flash point. A flash point of 23 C. (73 F.) or higher is required for expedited shipment by air freight.

In coatings of the present invention with "excess water", improved adhesion (or rate of development of adhesion at a given cure temperature) can be obtained by dipping twice to achieve the desired coating thickness (instead of dipping once at a faster withdrawal rate), by "pre-curing" to a "B stage" tack-free state (e.g., at 60° C. for 10 minutes—sometimes used for pre-inspection for coating flaws before final cure), and/or by ramping up to final cure temperature or stepping up, e.g., 93 C for 10 minutes, 110 C. for 10 minutes, 121 C. for 5 minutes, then cure at 130 C.; instead of placing lenses in a preheated 130 C. oven directly. We believe that each of these 3 optional steps helps to selectively volatilize the water in (and released during initial cure of) the coating, while the tail solvent remains (sufficiently) to reduce initial dry-down or curing stresses and to promote bonding to the substrate.

Preparation of specific formulations of the present invention are now given in the examples below:

EXAMPLE 1

A two-liter reaction vessel was charged with 533 g Nalco 1042 acid pH (42% solids in water) aqueous silica sol, 745 g methyltriethoxysilane and 51 g glacial acetic acid, heated to 60 C., and agitated until it exothermed to reflux at 84 C. It was cooled to 60 C., maintained one hour, then allowed to cool to room temperature. Four hours later, a latent condensation catalyst (0.65% s/s) was added, and the hazy solution was heated overnight (nominally 16 hours) at about 77 C., then allowed to cool down to ambient. After standing at room temperature for 7 days, 239 g of diacetone alcohol was added as tail solvent.

The resultant coating was used to dip coat acrylic and polycarbonate sheets at 26 C. and 39% R.H., followed by oven curing at 93 and 121 C., respectively. At 4–5 microns coating thickness, the cured coatings had 100% crosshatched tape adhesion and showed few or no scratches when rubbed with #000 steel wool, using 5 double strokes under firm thumb pressure.

Equivalent results were obtained from analogous samples dip coated at up to 55% R.H., and yet no hazing "blush" of the coating was observed, and primerless polycarbonate adhesion and scratch resistance were excellent. Analogous samples coated after a month of solution aging at room temperature still gave 100% adhesion to polycarbonate and excellent scratch resistance.

EXAMPLE 2

A mixture of 19.5 g Nalco 1042, 17.5 g diacetone alcohol, 3.9 g glacial acetic acid, and 27.2 g methyl triethoxy silane was stirred vigorously and exothermed to 32°–33° C. After 1½ hours, 22.1 g Nalco 1057 and an additional 27.2 g methyltriethoxysilane was added, and exothermed to 25°–26° C. After another 2½ hours, a latent buffered catalyst (0.65% s/s) was added, giving a hazy solution, which was then heated 8 hours at 79 C.

This formulation not only gave good adhesion on unprimed polycarbonate, as freshly prepared, but also after 5 months aging at room temperature, at which time it was still useable. Scratch resistance at 4–5 microns coating thickness was excellent, as in Example 1. Addition of fluorinated surfactant (3M's FC 430 in previously mentioned small concentrations) improved the coating flow-out/leveling for dip coating. An analogous formulation without the diacetone alcohol also gave 100% adhesion to unprimed polycarbonate—the 2-propoxyethanol solvent present in the Nalco 1057 was acting as substitute tail solvent, in that case.

EXAMPLE 3

Coatings propared analogously to those of Example 1 & 2 were applied to injection-molded polycarbonate lenses. Adhesion and scratch resistance were excellent. Scratch resistance was noticeably dependent on coating thickness, with the best resistance to 000 steel wool obtained at >4 microns coating thickness. The formulation like Example 2 developed 100% adhesion to PC faster than the coating like Example 1, even at a lower catalyst level. It was also more tolerant of high humidity while dip coating.

EXAMPLE 4

The coating solution of Example 2 was left at room temperature for 5 months, incompletely sealed, so that about 20% of the original volume evaporated. Used as-is for dip coating a polycarbonate plano safety spectacle lens, at 5-inch-per-minute withdrawal rate, the cured coating was about 12 microns thick, but was smooth and still had 100% adhesion and outstanding scratch resistance, without cracking or crazing. Five double rubs under firm pressure with very coarse #000 steel wool only produced a few, mostly fine scratches. After dilution with isopropanol, similar results were obtained by flow coating.

EXAMPLE 5

Coatings analogous to Examples 1 & 2, but prepared with diacetone alcohol added prior to the methyltriethoxysilane and/or optionally without heat-accelerated aging or "bodying", and especially with a surfactant such as FC-430, were used on polycarbonate safety lenses, and gave excellent cured coatings equivalent to those of Examples 1 & 2.

EXAMPLE 6

A coating prepared from 13.2 parts Nalco 1042, 24.6 parts methyltriethoxysilane, 1.7 parts glacial acetic acid , 7.9 parts diacetone alcohol, 1% (s/s) quaternary ammonium catalyst, and 0.006 parts FC-430 was used to coat a polycarbonate lens, giving a cured coating with 100% adhesion and with scratch resistance barely less than the coating of Example 1, despite the use of 25% less silica on a relative basis. The coating developed 100% adhesion in a faster time with more catalyst, but some crazing appeared in the cured coating at 1.5–2.0 % catalyst.

EXAMPLE 7

A coating like Example 2, but without diacetone alcohol, and only using ¼ as much glacial acetic acid, gave excellent results like Example 2.

EXAMPLE 8

To show the advantage of using methyltriethoxysilane ("MTES") instead of methyltrimethoxysilane ("MTMS") in the coatings of the present invention, a series of mixtures of Nalco 1042, silane(s) and acetic acid was prepared. To each of the seven vials were added in order the ingredients listed in Table I, followed by capping, shaking 15 seconds twice (with a 15-second delay), letting stand ½ hour, and tumbling 1 hour. Sample I, with only methyltrimethoxysilane present, became homogeneous and quite warm immediately upon shaking. The other samples through Sample VII were progressively slower and less warm, but all were homogeneous after tumbling. The vials were then let stand at ambient temperature until they gelled, to demonstrate the relative stability of scratch resistant coating resins made from colloidal silica and either or both methyltriethoxysilane and/or methyltrimethoxysilane. As shown in Table I, there is a 5–50 fold increase in the stability of the mixture when half or more of the methyltrimethoxysilane is replaced with methyltriethoxysilane. Although dilution is known to increase the stability of these mixtures, the effect with methanol by itself is small (2.5× for a dilution equivalent to Sample VII's greater volume versus Sample 1), as confirmed in a separate analogous test.

TABLE I

| Sample No.: | I | II | III | IV | V | VI | VII |
|---|---|---|---|---|---|---|---|
| MTMS:MTES mole ratio | 6:0 | 5:1 | 4:2 | 3:3 | 2:4 | 1:5 | 0:6 |
| MTMS, grams | 1.08 | 0.90 | 0.72 | 0.54 | 0.36 | 0.18 | — |
| MTES, grams | — | 0.24 | 0.47 | 0.71 | 0.94 | 1.18 | 1.41 |
| Acetic Acid, drops* | 2 | 2 | 2 | 2 | 2 | 2 | 2 |
| Nalco 1042, grams | 1.01 | 1.01 | 1.01 | 1.01 | 1.01 | 1.01 | 1.01 |
| Days to gel | 3 | 5–7 | 11 | 18–23 | 44 | 134 | >230 |

*2 drops glacial acetic acid = 0.035–0.04 grams

COMPARATIVE EXAMPLE A

A mixture of 43.7 g Nalco 1042 and 19.7 g diacetone alcohol (added at this point to reduce viscosity) was chilled in an ice bath, and a mixture of 46.6 g methyltrimethoxysilane and 2.3 g glacial acetic acid was added and stirred in vigorously at a rate to limit exotherm to −15 C. (5 F.). After standing 12 hours in the ice bath, a mixture of 2.1 g acetic acid, 6.1 g isopropyl alcohol, and a latent condensation catalyst (0.65% s/s) was added and mixed in.

After standing about a week at room temperature to develop "body" (increased molecular weight & viscosity), the coating was used to dip coat acrylic and polycarbonate sheets, followed by oven curing at 93–121 C. respectively, at the same time as the samples coated with the formulation of Example 1. At 4–5 microns coating thickness, the cured coatings had 100% cross-hatched tape adhesion only on acrylic. Adhesion to polycarbonate was 0–20%, even after curing overnight at 121 C. On either substrate, abrasion resistance was equivalent to that for Example 1.

COMPARATIVE EXAMPLE B

A commercial coating offered by SDC coatings Inc., of Anaheim, Calif., named "Silvue 121", believed to comprise a reaction product of acidic aqueous colloidal silica and methyltrialkoxysilane but containing no "tail solvent" as defined herein, gave 0% adhesion when coated and cured on unprimed polycarbonate under conditions analogous to those for Example 1. (Apparently recognizing that limitation, SDC sells various primers to be used onto polycarbonate substrates with such coatings.)

COMPARATIVE EXAMPLE C

SHC-1200 from GE Silicones, Waterford, N.Y., was used to prepare a 4–5 micron coating on unprimed polycarbonate, by dip coating and curing as for Example 1. Steel wool testing showed that the coating according to Example 1 had equal or slightly better abrasion resistance than this GE coating, which contains diacetone alcohol. This GE competitive coating had 100% adhesion on unprimed polycarbonate, but can be very unstable in an open-topped diptank operating at room temperature, even with continuous pump circulation and filtration.

We claim:

1. A silane/silica sol copolymer liquid thermosetting hardcoating composition for imparting scratch resistance to transparent plastic substrates, said composition comprising a reaction product of:
   a. an acidified aqueous dispersion of colloidal silica having average particle size <100 millimicrons in diameter, with
   b. a monomethyl trialkoxy silane mix consisting essentially of 67–100% monomethyltriethoxysilane and 33–0% monomethyltrimethoxysilane,
   wherein said reactants are copolymerized in a ratio of not less than 30:70 and not more than 70:30% and said reaction product along with
   c. a latent condensation catalyst, and
   d. at least one tail solvent; such that said silane/silica sol copolymer liquid thermosetting hardcoating composition, when standing at ambient temperature, does not gel within 30 days.

2. A silane/silica sol copolymer liquid thermosetting hardcoating composition for imparting scratch resistance to transparent plastic substrates, said composition comprising a reaction product of:
   a. an acidified aqueous dispersion of colloidal silica sol having average particle size <100 millimicrons in diameter, with said acidified aqueous dispersion of colloidal silica sol being comprised partly by colloidal silica sol dissolved in water-miscible solvent;
   b. a monomethyl trialkoxy silane mix consisting essentially of 67–100% monomethyltriethoxysilane and 33–0% monomethyltrimethoxysilane, wherein said reactants a and b are copolymerized in a ratio of not less than 30:70 and not more than 70:30,
   wherein said acidified aqueous dispersion of colloidal silica sol being comprised partly by colloidal silica sol dissolved in water-miscible solvent is added along with the additional monomethyl trialkoxy silane mix b into a batch of partly-reacted acidified aqueous dispersion of colloidal silica sol previously silanized with the monomethyl trialkoxy silane mix b,
   and said reaction product along with
   c. a latent condensation catalyst, and
   d. at least one tail solvent;
   such that said silane/silica sol copolymer liquid thermosetting hardcoating composition, when standing at ambient temperature does not gel within 30 days.

3. A hardcoating composition of claim 1, wherein substantially all the monomethyltrialkoxysilane is monomethyltriethoxysilane.

4. A hardcoating composition of claim 1, wherein said tail solvent has greater than 100 C. boiling point and is substantially all diacetone alcohol, comprising at least 3% in the liquid hardcoating composition.

5. A hardcoating composition of claim 1 wherein said reactants are copolymerized in a ratio of substantially 40:60 $SiO_2:CH_3SiO_{3/2}$.

6. A hardcoating composition of claim 1 wherein said latent condensation catalyst is a quaternary ammonium catalyst, at about 0.5–1.5% s/s concentrations.

7. A hardcoating composition of claim 1 wherein said reactants are copolymerized and the reaction product is not substantially stripped or devolatized to remove excess water and/or alcohol, be fore the liquid coating is applied onto the transparent plastic substrate.

* * * * *